US006520310B1

(12) United States Patent
Lauch et al.

(10) Patent No.: US 6,520,310 B1
(45) Date of Patent: Feb. 18, 2003

(54) COMBPLATE LOAD AND OBSTRUCTION SENSOR APPARATUS

(75) Inventors: Richard Lauch, Hopatcong, NJ (US); Melanie J. Smith, Bedminster, NJ (US)

(73) Assignee: Inventio AG, Hergiswil NW (CH)

( * ) Notice: Subject to any disclaimer, the term of this patent is extended or adjusted under 35 U.S.C. 154(b) by 0 days.

(21) Appl. No.: 10/032,912

(22) Filed: Dec. 27, 2001

(51) Int. Cl.[7] .............................................. B65G 43/00
(52) U.S. Cl. ...................................... 198/323; 198/325
(58) Field of Search ................................. 198/323, 325

(56) References Cited

U.S. PATENT DOCUMENTS

| | | | | |
|---|---|---|---|---|
| 3,233,717 A | * | 2/1966 | Jin et al. | 198/323 |
| 3,580,376 A | * | 5/1971 | Loshbough | 198/323 |
| 4,088,219 A | | 5/1978 | Binns | |
| 4,126,218 A | * | 11/1978 | El Taher et al. | 198/325 |
| 5,255,771 A | | 10/1993 | Nurnberg et al. | |
| 5,307,918 A | | 5/1994 | Rivera et al. | |
| 5,372,321 A | * | 12/1994 | Volkening et al. | 198/325 |
| 5,381,687 A | * | 1/1995 | Hguyen et al. | 73/1 B |
| 5,398,800 A | | 3/1995 | Hofling et al. | |
| 5,482,153 A | * | 1/1996 | Abraham et al. | 198/323 |
| 5,611,417 A | | 3/1997 | Stawniak et al. | |
| 5,718,319 A | * | 2/1998 | Gih | 198/323 |
| 5,842,554 A | * | 12/1998 | Stoxen et al. | 198/322 |

FOREIGN PATENT DOCUMENTS

| | | | | |
|---|---|---|---|---|
| CA | 884727 | * | 11/1971 | 198/325 |
| DE | 727487 | | 11/1942 | |
| EP | 0 325 293 A1 | | 7/1989 | |
| EP | 523832 | * | 1/1993 | 198/323 |
| EP | 0 594 396 B1 | | 4/1994 | |
| EP | 0 801 021 A2 | | 10/1997 | |
| JP | 2-123091 | * | 5/1990 | 198/323 |
| WO | WO 97/14644 A1 | | 4/1997 | |
| WO | WO 98/04491 A1 | | 2/1998 | |
| WO | WO 99/08953 A1 | | 2/1999 | |

OTHER PUBLICATIONS

Patent Abstracts of Japan, No. 03079590A, Safety Device For Passenger Conveyor, Apr. 4, 1990, Mitsubishi Electric Co.

* cited by examiner

*Primary Examiner*—Douglas Hess
(74) *Attorney, Agent, or Firm*—Schweitzer Cornman Gross & Bondell LLP

(57) ABSTRACT

An escalator combplate load and obstruction sensor is capable of monitoring and indicating both horizontal and vertical force and loads. The combplate is mounted for limited horizontal and vertical travel in response to corresponding horizontal and vertical loads. Both the horizontal and vertical travel are resolved into a displacement at an angle to both the horizontal and vertical, and the displacement is applied to a sensing portion of a loadcell which generates an electrical output proportional to the applied displacement and force. An indicator is coupled to the loadcell to indicate a relationship between the displacement applied to the loadcell and at least one reference value, whereby the horizontal and vertical loads applied to the combplate can be monitored and improper load levels determined. By proper choice of the displacement angle differing vertical and horizontal forces can be resolved into the same displacement, allowing a single indicator to simultaneously display both vertical and horizontal loading status.

15 Claims, 5 Drawing Sheets

FIG. 4A
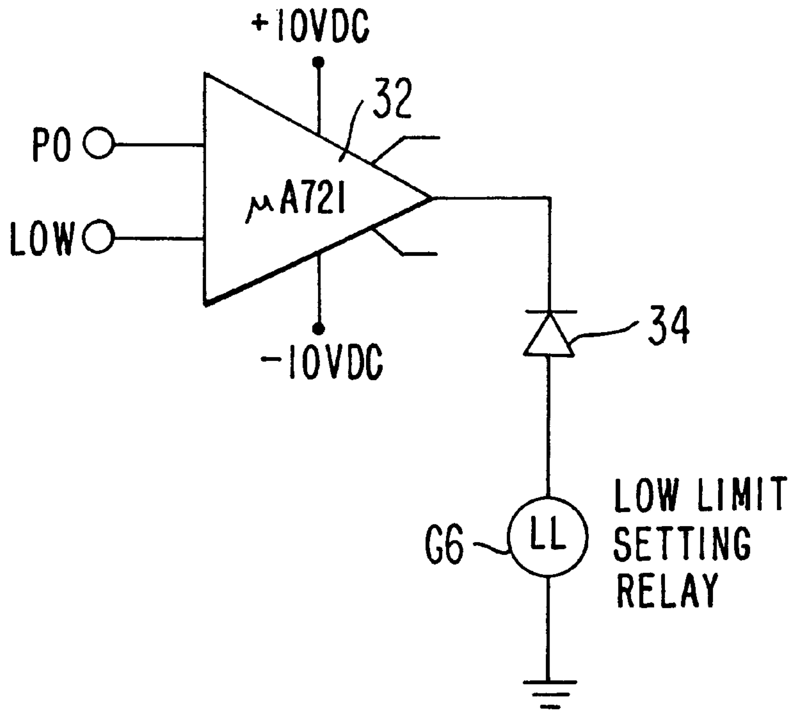
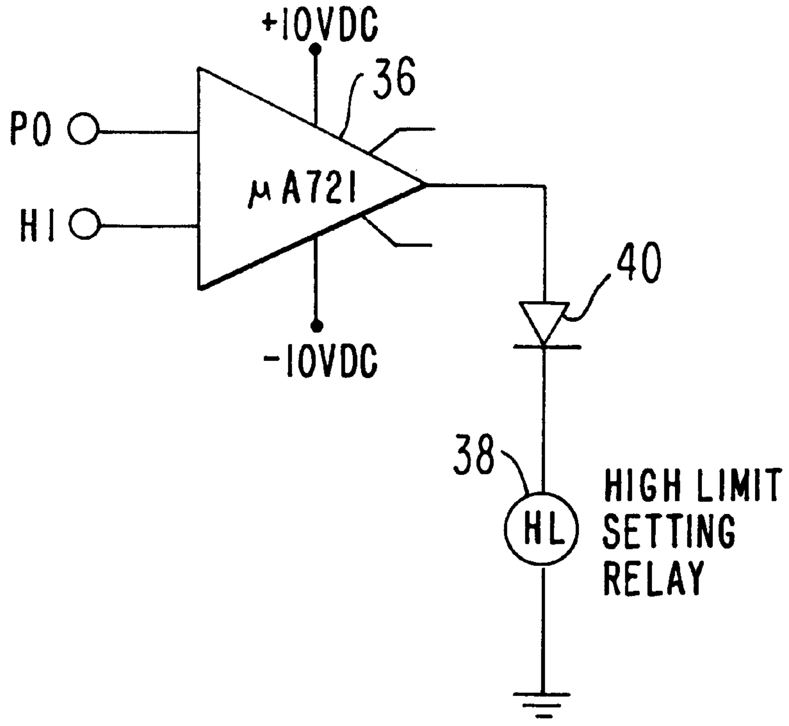
FIG. 4B

COMBPLATE LOAD AND OBSTRUCTION SENSOR APPARATUS

The present invention relates to a new and improved escalator combplate load and obstruction sensor capable of monitoring and indicating both horizontal and vertical force and load components.

BACKGROUND OF THE INVENTION

Numerous load-based safety regulations control operating conditions for public escalators. Many of such regulations address load conditions at the escalator combplates, which serve as the entry and exit ways to the moving escalator steps. Such regulations may require, for example, that escalator power be interrupted in the event a force at greater than a particular level is applied to the escalator combplate in the (horizontal) direction of travel, or if a vertical force in the upward direction is applied to the combplate in excess of a specified minimum. Heretofore, safety systems intended to be responsive to such requirements have been of a mechanical nature. U.S. Pat. No. 5,611,417, for example, utilizes a bias trigger spring. Manual resetting of the device is required once triggered. The device set forth in U.S. Pat. No. 5,255,771 provides a pair of limit switches which are opened when the combplate is sufficiently displaced to overcome the force of override springs. In U.S. Pat. No. 5,307,918, the movement of the combplate resulting from the entrapment of an object between the steps and combplate creates activates a power interruption switch to stop further movement of the steps.

While the foregoing devices can provide for automatic shutdown of the escalator in the event of combplate displacement, they do not include a mechanism for the efficient preloading of the device to accommodate adjustments to the weight of the escalator combplate itself. Further, such devices have no facility for allowing the continuous monitoring of combplate loading.

It is accordingly a purpose of the present invention to provide a combplate load and obstruction sensor which is easily adjustable and can continuously monitor combplate load.

It is a further purpose of the present invention to provide a combplate load and obstruction sensor which is of both sensitive and rugged design.

It is still a further purpose of the present invention to provide a combplate load and obstruction sensor which can provide a plurality of control signals associated with both horizontal and vertical upward overloading conditions.

BRIEF DESCRIPTION OF THE INVENTION

In accordance with the foregoing and other objects and purposes, an escalator combplate load and obstruction sensor apparatus constructed in accordance with the present invention comprises an electronic load cell transducer element mounted between the escalator combplate and the escalator frame. The load cell is preferably mounted to the combplate, and is engaged by a force-applying contact mounted to the escalator frame. The load cell may be mounted at an angle to both the horizontal and vertical. With the load cell at an angle to both the vertical and horizontal, both vertical and horizontal displacements of the combplate resulting from obstruction and lift forces are transmitted to and sensed by the load cell through the contact element. The combplate may be supported by a leveling device having a slightly compressive member such that downward displacements to the combplate occur as a result of personnel loading are applied to the load cell, allowing the continuous monitoring of use load as the load applied thereto varies.

The output of the load cell, which is preferably a voltage proportional to the load on the cell, is processed and compared to signals corresponding to set point force levels, such as the minimum vertical upward force or horizontal load for an alarm condition. Appropriate indicators and alarms may be activated when the set point loads are exceeded. With incorporation of an appropriate timer, unsafe or unstable operating conditions as may occur to prevent rapid user transit across the combplate can be recognized by monitoring the residence time of user load on the combplate.

BRIEF DESCRIPTION OF THE DRAWINGS

A fuller understanding of the present invention will be accomplished upon consideration of the following description of a preferred, but nonetheless illustrative embodiment of the invention when reviewed in conjunction with the annexed drawings, wherein:

FIGS. 4A and 4B are circuit diagrams depicting preload setting circuitry for the load cell;

DETAILED DESCRIPTION OF THE INVENTION

Figure 1:
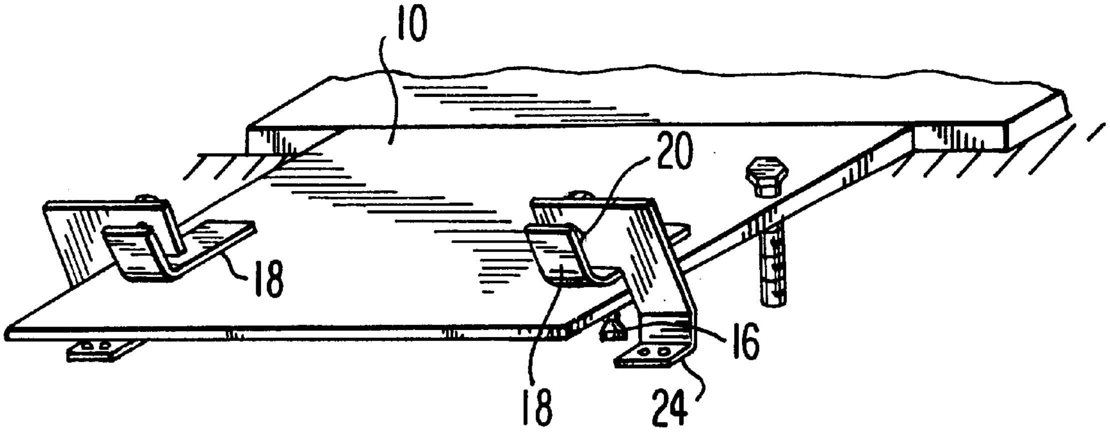
FIG. 1 is a perspective view of an escalator comb plate with the present invention installed thereon.
Figure 2:
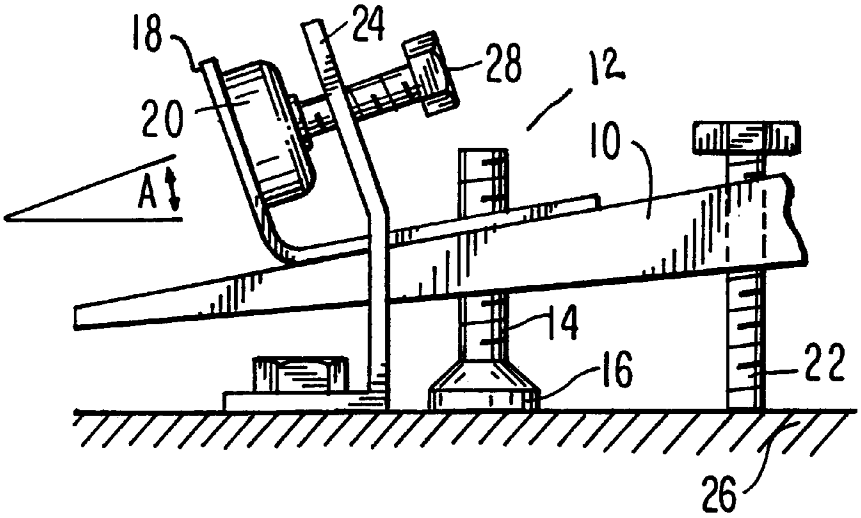
FIG. 2 is a side elevation view thereof.

With initial reference to FIGS. 1 and 2, escalator combplate 10 serves as a landing for persons departing from or mounting upon an escalator. As shown, the combplate 10 may be supported at a first end by a pair of slide pins or brackets (not shown) mounted to the escalator frame 26 and at a second end by a pair of leveling devices 12 which may comprise threaded stems 14 each resting upon a resilient pad 16 between the stem and the escalator frame, which pad may, for example, be formed of polyurethane or cork. A pair of hold-down bolts 22, threaded into the escalator frame 26, limit the upward travel of the combplate. The leveling devices 12 and hold-down bolts 22 replace the conventional mounting means and provide for a limited amount of vertical downward displacement from the no-load position of the combplate in response to the weight of a person or persons on the combplate. In association with the slide pins or brackets they also allow for small horizontal displacements in response to horizontal forces applied to the combplate. Alternative support means for the combplate, such as spring-biased supports, may also be utilized to provide limited travel of the combplate.

L-shaped brackets 18 are affixed to the opposite sides of the combplate, each supporting a load cell 20. The load cell 20 has an area on its front face serving as a displacement force receptor, such displacement force being converted to a variable voltage output Suitable load cells are manufactured by Eltran Devices, Inc. of Fairfield N.J.

Each load cell is preferably mounted at an acute angle A to the horizontal. Bracket 24, which is securely mounted to the escalator frame 26, supports bolt 28, the end of which is in contact with the sensing surface of the load cell front face. As may be seen, displacement of the combplate with respect to the escalator frame will result in a corresponding variation in the contact force asserted by the bolt 28 against the load cell. Because leveling device 12 supporting the combplate is provided with the resilient pad 16, variations in the passenger load applied to the combplate result in variation of the degree of compression of the pad, resulting in small vertical downward displacements of the combplate. As the load cell is positioned at an angle to both the horizontal and vertical, vertical displacements of the combplate are resolved into two components, one of which is parallel to the axis of the bolt 28 and thus is converted to relative motion of the load cell with respect to the bolt. Horizontal displacements of the combplate are similarly resolved into two components, the component parallel to the bolt axis similarly generating load cell displacement in accordance therewith, causing a variation in the contact force applied by bolt 28 and varying the load cell's electrical output signal.

It is to be appreciated that the choice of angle A determines how the horizontal and vertical forces and displacements applied to the combplate are resolved into the component applied to the load cell. At an angle A of 45 degrees, for example, trigonometry teaches that both vertical and horizontal displacements will be equally resolved into the component parallel to the bolt 28 axis. As angle A increases, however, a greater portion of a vertical displacement is resolved into the parallel component, while a smaller portion of a horizontal displacement is so resolved. Thus, by an appropriate choice of angle, a scale factor can be applied to horizontal and vertical displacements and forces of differing magnitudes to allow greatly differing force levels to be generate comparable load cell displacement, eliminating the need for wide range load cells or circuitry responsive to both large and small output variations and conditions. Angle A can also be chosen with consideration of the characteristics of the load cell and the compression characteristics of the pad 16. Alternative support means for the combplate such as spring-biased supports, may be utilized to provide for limited travel.

Figure 3:
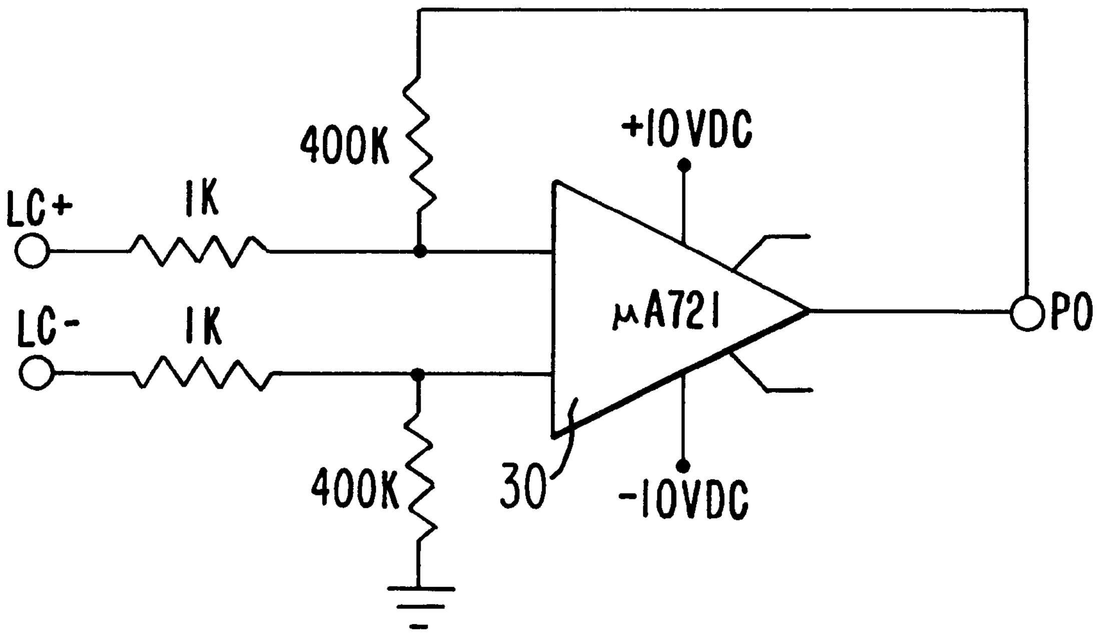
FIG. 3 is a circuit diagram depicting the primary electrical circuitry associated with the load cell of the invention.

FIG. 3 depicts the first stage processing circuit for the load cell. A typical load cell to be used in connection with the invention may provide an output in the range of plus or minus 2 millivolts/volt input, linearly proportional to the strain or compression applied to the cell placed thereon over its response range when connected to a dual ended power supply. With a contemplated supply of +/−10 volts dc, an output in the range of +/−20 millivolts is generated. The output leads of the load cell are connected to terminals LC+ and LC− of integrated circuit 30, which is an operational amplifier configured as a high gain, stable DC amplifier. With the circuit values shown therein, the load cell's output is subject to a gain of 400, generating at output terminal PO a signal in the range of between plus or minus 8 volts.

The output of operational amplifier 30 may be monitored and used to trigger alarms associated with various forces and loading factors, both vertical and horizontal. In general, the output voltage is compared to an appropriate reference voltage that corresponds to an appropriate vertical or horizontal combplate force or combplate load, calculated through application of the appropriate scale factor based on the chosen angle A.

Because many load cells are bipolar, it is desirous to preload the load cell to place its output in the normal, unloaded state sufficiently away from zero to avoid the necessity to accommodate output polarity changes and the need to provide a coupling to the load cell which is responsive to strain as well as compression, which can be easily monitored by a simple point contact, such as provided by bolt 28. In addition, potential circuit non-linearities are often most prevalent at small signal levels; providing a no-load or quasi-static output level displaced from zero can avoid such problems.

Figure 7:
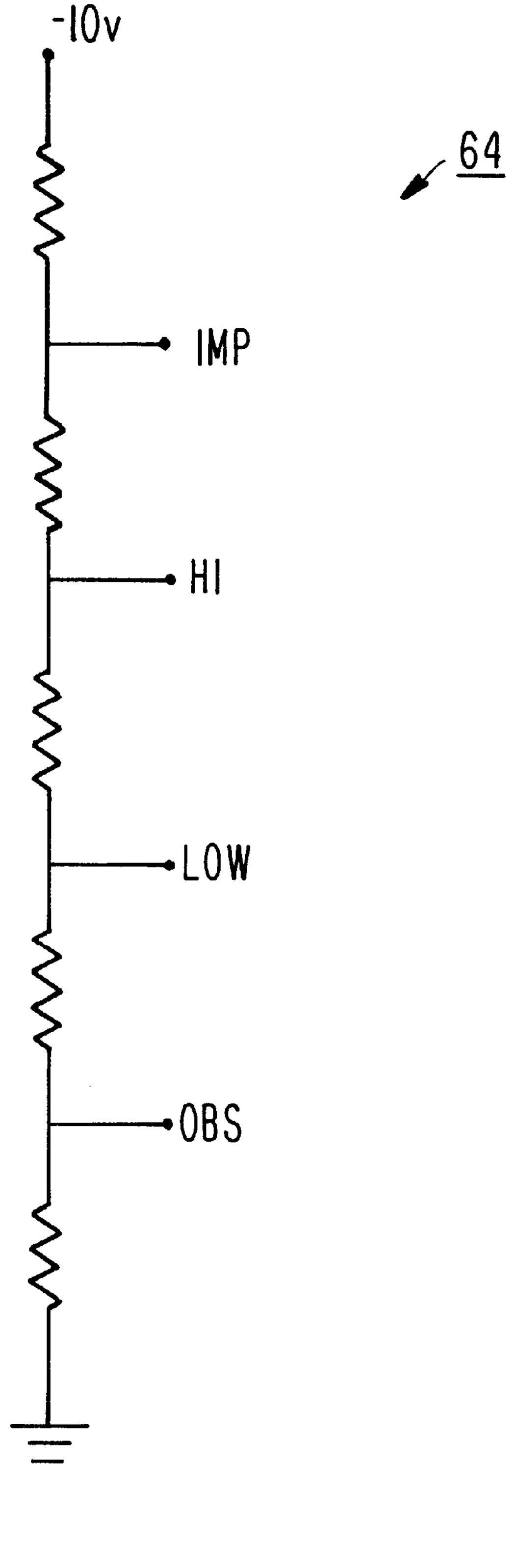
FIG. 7 is a schematic of a resistor string capable of generating reference voltages for load comparison purposes.

As load cell compression typically generates a negative output, the application of a preload by bolt 28 places the output of load cell 20 into the negative range. To generate a series of reference voltages, a resistor string 64 as shown in FIG. 7 can be employed. The resistor string is coupled between a −10 volt potential and ground, acting as a voltage divider network. With a preload on the load cell applied to place the load cell sufficiently deep into the compression mode, generating a sufficiently negative output voltage, the reference voltages can also be negative for the full range of forces and loads, both vertical and horizontal, expected to be applied to the combplate.

In conjunction with the adjustability of contacting bolt 28, FIGS. 4A and 4B depict a pair of sister circuits which may be used to allow a chosen preload level to be set and applied to the load cell. FIG. 4A depicts a circuit in which relay 70 is activated when the preloading of the load cell is above a chosen value. A dc voltage generated by an appropriate tap on resistor string 64 in FIG. 7, corresponding to the minimum value for the preload force ("Low") is applied to the negative (second) input of operational amplifier 32, configured as a comparator, as known in the art. The output PO from the amplifier of FIG. 3 is applied to the positive (first) input. As known, the output of the comparator is positive when the signal applied to the first input is more positive (i.e. less negative) than the input applied to the second input, and is negative when the first input is more negative that second input. Diode 34 in the comparator's output line in series with relay 70 prevents the relay from operating hen the output of the comparator is positive. So long as a loading on the load cell is below the low value, PO>Low, and the comparator's output is positive. When the loading is reached, however, PO<Low, generating a negative output which is passed by diode 34, activating relay 70 and allowing an appropriate indicator controlled by the relay, such as a light-emitting diode, to be activated.

In a similar manner, FIG. 4B illustrates a circuit which can monitor the upper bound of a preload. As shown therein, operational amplifier 36 is configured as a comparator with PO applied to the first input and reference signal HI applied to the second input. The HI voltage may also be obtained from resistor string 64, and corresponds to an upper limit for the preloading of the load cell. High limit setting relay 38 is in series with diode 40 at the output of the comparator. When the preload force PO is less than the upper limit, PO is less negative than HI, and a positive output current is established, flowing through diode 40 allowing HI limit setting relay 38 to be activated. An appropriate indicator can be energized. When the preloading force passes the upper limit, PO<HI, and the comparator output goes to zero and then becomes negative. Diode 40 blocks the reverse current flow and relay 38 releases, de-energizing the indicator, indicating that the HI level has been exceeded. For preloading force levels between the low set point and the high set point (LOW<PO<HI), both low setting limit relay 70 in FIG. 4A, as well as HI limit setting relay 38 in FIG. 4B are active and the corresponding indicators energized. The preload range can thus be identified.

Figure 5:
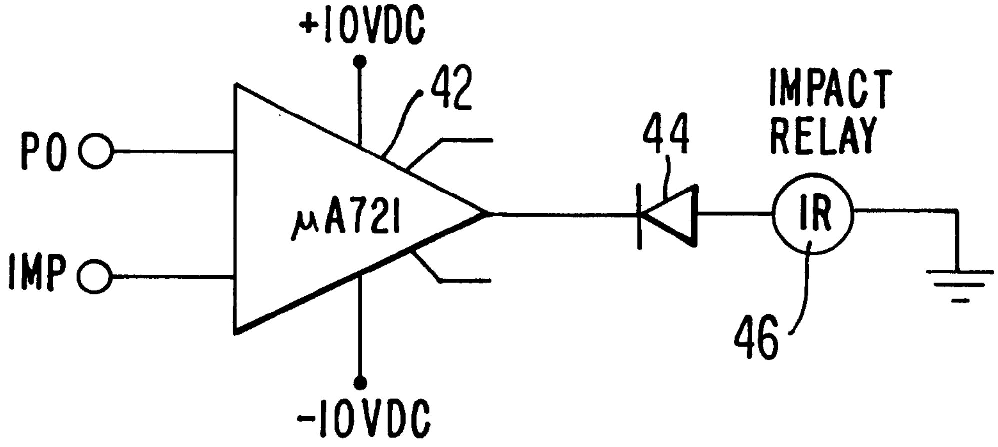
FIG. 5 is a schematic diagram of a circuit to be used for step impact sensing.

FIG. 5 depicts a similarly constructed circuit that may be used to monitor stair step impact, defined as an upward, vertical force to the combplate exceeding a reference value. With the construction and orientation of the sensor as depicted in FIGS. 1 and 2, such a force raises the load cell and is resolved into an increase to the preload force to the load cell and thus an output voltage PO which is more negative than the preload output. The circuit of FIG. 5 is capable of recognizing such voltage increase. Once again, an operational amplifier 42 is configured as a comparator between signal input PO and impact reference voltage IMP, derived from resistor string 64. Since an upward force to the combplate increases the loading of the loadcell, the reference voltage IMP is a larger negative voltage than the preload voltage. Thus, in normal operation PO is less negative than IMP (PO>IMP), and the output of the comparator is positive. Diode 44 blocks this current and impact relay 46 is not energized. When an impact force develops, however, the compression applied to and thus the negative output of the load cell increases and exceeds the impact reference voltage. The output of the comparator 42 becomes negative, allowing diode 44 to conduct, which in turn activates the impact relay 46 allowing an appropriate indicator light or other indicator to be activated.

The ASME code provides for escalator shutdown with an upward vertical force of 150 pounds to the center of the combplate, as well as shutdown with a 400 pound horizontal force at either side of the combplate or an 800 pound horizontal force at the center of the combplate. With an angle A of 10.6° from the horizontal, both a 800 pound central force (400 pound per side) and a 150 pound vertical force are resolved into the same force applied to the load cell. Thus the circuit of FIG. 5 can be used to simultaneously monitor both horizontal and vertical combplate forces and generate a single alarm signal which is indicative of either a horizontal or vertical overload condition.

Figure 6A:
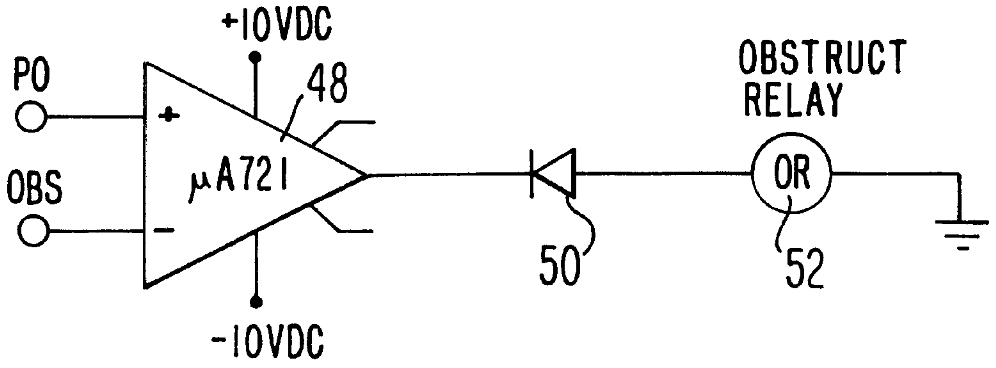
FIGS. 6A and 6B are schematic diagrams of circuits which may be used to provide the comb plate obstruction monitoring action of the invention.
Figure 6B:
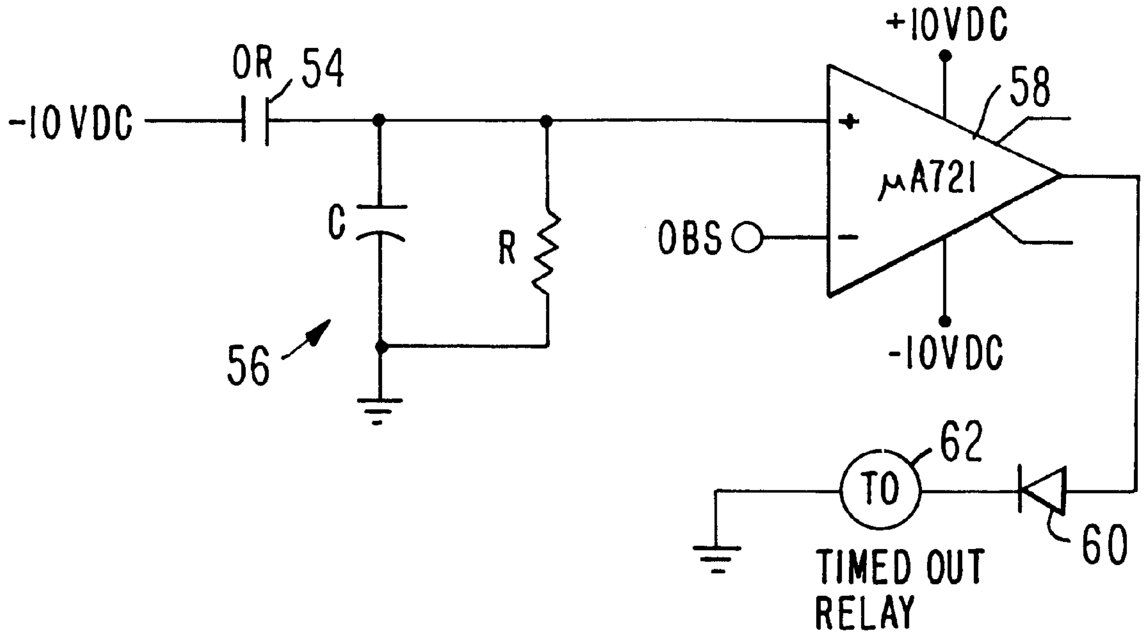

Incorporating the pads depicted in FIGS. 1 and 2, as opposed to having the combplate rest directly on the escalator frame, make the position of the combplate responsive to downwardly-directed loads, such as resulting form a person stepping on the combplate, in addition to upward and horizontal forces. FIGS. 6A and 6B depict a circuit which may be used to monitor comb plate obstruction, which occurs when a load is placed on the comb plate which remains in place for an excessive amount of time. This might occur, for example, if there is a backup on the escalator, causing a person to remain on the combplate and preventing the person from promptly traversing the combplate. With further reference to FIGS. 1 and 2, it may be seen that the displacement of the comb plate as a result of a passenger load is downward, reducing the compression force on the load cell and thus generating a less negative load cell output. Thus, in FIG. 6A operational amplifier/comparator 48 compares the load cell output PO with reference signal OBS which is chosen to represent an average user load, a value less negative than the preload load cell value. With no user on the combplate, PO<OBS, the output of comparator 48 is negative, and diode 50 allows obstruction relay 52 to be energized. As a user steps onto the combplate, the compression applied to the load cell decreases, lowering the magnitude of the loadcell's negative output such that PO>OBS. The comparator's output becomes positive, diode 50 interrupts the current flow, and obstruction relay 52 opens.

As shown in FIG. 6B, the contacts 54 of obstruction relay 52 are connected to a negative 10-volt potential source, and are fed to the first input of operational amplifier/comparator 58 to be compared to a less negative potential, such as the reference OBS signal. Located on the input line, however, is RC network 56. In the absence of combplate load, the contacts 54 are closed as a result of the activation of relay 52. Thus the −10 volt potential is maintained upon the RC network and to the input to the comparator. In steady-state conditions, with a continuous d.c voltage applied, capacitor C quickly becomes and remains fully negatively charged. The negative 10-volt potential, exceeding the negative potential applied to the OBS input, causes comparator 58 to generate a negative output, which is blocked by output line diode 60 and keeps timed-out relay 62 un-energized.

When obstruction relay 52 opens as the result of somebody stepping on the combplate, relay contacts 54 open and the negative 10-volt potential is removed from the RC network 56 and the input to comparator 58. Capacitor C begins to discharge through resistor R, lowering the negative potential applied to the comparator towards zero. As the negative reference voltage established by OBS is passed, the first input to the comparator becomes less negative (more positive) and the output of the comparator 58 switches to positive, which is passed by diode 60 to relay 62 which then energizes and indicates an obstruction condition. The rate at which the input voltage to the comparator goes to zero is controlled by the values of capacitor C and resistor R, and is chosen such that a desired delay time, corresponding to the critical obstruction time, results in relay operation. If the obstruction is cleared before the relay 62 energizes, the negative 10-volt potential is reapplied to the RC network 56 and comparator 58 through the contacts 54, causing the immediate recharge of the capacitor and maintenance of the output of comparator 58 in the negative sense.

As may be appreciated from the foregoing, the combplate load and obstruction sensor apparatus of the present invention is capable of continuously monitoring and controlling the operation of an escalator with respect to a variety of combplate conditions. One skilled in the art may readily recognize the full and complete scope of the invention as presented in the annexed claims.

We claim:

1. An escalator combplate load monitor apparatus, comprising a combplate mounted for limited motion in horizontal and vertical directions relative to an escalator frame in response to horizontal and vertical force loads applied to the combplate; means associated with the combplate for resolving the horizontal and vertical motions into a displacement at an angle to the vertical and horizontal; a loadcell having an electrical output proportional to a displacement force applied to a loadcell surface mounted to accept the displacement, and indicator means coupled to the loadcell to indicate a relationship between the displacement applied to the loadcell and at least one reference value of combplate loading.

2. The monitor apparatus of claim 1, further comprising a resilient support for an end of the combplate.

3. The monitor apparatus of claim 2 wherein the resilient support means is an adjustable leveling unit having a resilient pad.

4. The monitor apparatus of claim 1 further comprising means for applying an adjustable preload force to the loadcell.

5. The monitor apparatus of claim 4 wherein the means for applying the preload force is a bolt threadably received in a support bracket.

6. The monitor apparatus of claim 1 or claim 2 further comprising a mount for the loadcell that places the loadcell at the displacement angle.

7. The monitor apparatus of claim 6 wherein the loadcell mount is affixable to the escalator frame and the means for resolving the horizontal and vertical motions into a displacement at an angle to the vertical and horizontal is a bolt threadably received in a support bracket mounted to the combplate.

8. The monitor apparatus of claim 1 or claim 2 further comprising processing means for the loadcell electrical output coupled between the loadcell and the indicator means.

9. The monitor apparatus of claim 8 wherein the processing means comprise an amplifier.

10. The monitor apparatus of claim 8 wherein the indicator means indicate at least one of combplate preloading, combplate loading, combplate obstruction, and step impact.

11. The monitor apparatus of claim 8 wherein the indicator means monitor and indicate combplate preloading, combplate loading, combplate obstruction, and step impact.

12. The monitor means of claim 11 wherein the processing means include a time delay circuit associated with the indicator means for monitoring and indicating combplate loading.

13. The monitor apparatus of claim 8 wherein the angle is chosen to resolve a first chosen reference value for combplate obstruction and a second chosen reference value for step impact into the same displacement.

14. The monitor apparatus of claim 10 wherein the indicator means comprise a comparator to compare loadcell output to a reference value and an indicator to indicate a result of such comparison.

15. The monitor apparatus of claim 14 wherein the reference value is a voltage generated by a resistive network connected across a voltage source.

* * * * *